Figure 1:
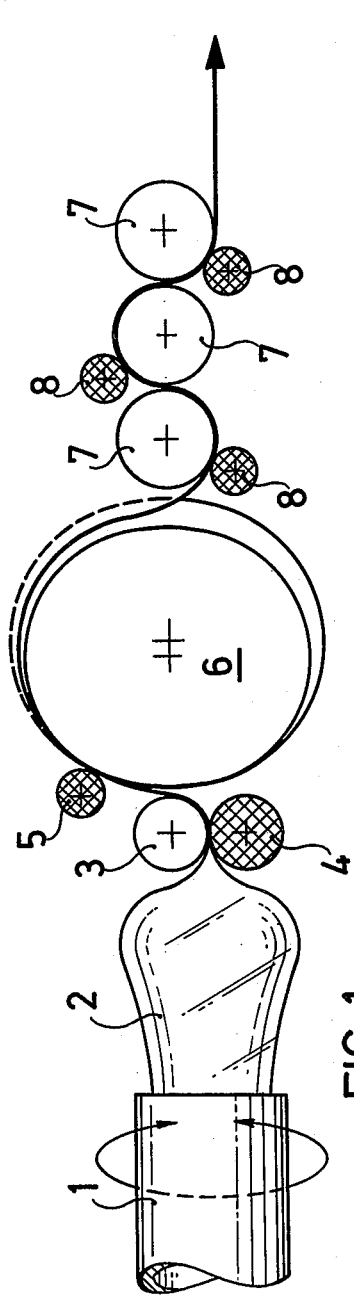

United States Patent [19]
Andersen et al.

[11] 3,884,748
[45] May 20, 1975

[54] PROCESS AND DEVICE FOR THE STRETCHING OF PLASTICS SHEETS

[75] Inventors: Heinz-Erhardt Andersen, Burgkirchen/Alz; Georg Stangl, Ehring, both of Germany

[73] Assignee: Hoechst Aktiengesellschaft, Frankfurt am Main, Germany

[22] Filed: Nov. 21, 1972

[21] Appl. No.: 308,564

[30] Foreign Application Priority Data
Nov. 24, 1971 Germany .....................2158141

[52] U.S. Cl. ................. 156/494; 156/229; 264/95; 264/289; 425/66; 425/325
[51] Int. Cl. ........................................... B31b 31/02
[58] Field of Search............ 425/72, 66, 326 R, 325, 425/380, 381; 264/289, 290, 95, 210 R; 156/229, 494

[56] References Cited
UNITED STATES PATENTS

| | | | |
|---|---|---|---|
| 3,211,816 | 10/1965 | Brown............................. | 425/66 X |
| 3,238,565 | 3/1966 | Jacobs ........................... | 264/321 X |
| 3,355,763 | 12/1967 | Willert............................ | 425/381 X |
| 3,423,790 | 1/1969 | Gabbrielli ...................... | 425/381 X |
| 3,461,501 | 8/1969 | Stewart.......................... | 425/381 X |
| 3,576,934 | 4/1971 | Vaghi............................. | 425/66 X |
| 3,577,488 | 5/1971 | Bigland.......................... | 264/95 |
| 3,581,344 | 6/1971 | Sederlund et al............... | 425/381 X |
| 3,590,432 | 7/1971 | Schott............................ | 425/381 X |
| 3,723,583 | 3/1973 | Hovermale et al. ............ | 264/289 X |
| 3,807,004 | 4/1974 | Andersen....................... | 264/289 X |

Primary Examiner—Edward G. Whitby
Attorney, Agent, or Firm—Connolly and Hutz

[57] ABSTRACT

In the process for stretching thermoplastic sheets using rotating disks on the circumferential surfaces of which the sheet edges are pressed a tubular sheeting is extruded from a rotating or oscillating blow head, the sheeting is flattened in the hot state and welded before being heated at stretching temperature, and stretched.

4 Claims, 2 Drawing Figures

PROCESS AND DEVICE FOR THE STRETCHING OF PLASTICS SHEETS

The present invention relates to an improvement in the process and device for stretching plastics sheets produced by blow molding.

U.S. Pat. No. 3,807,004 provides a process for strethcing a sheet of thermoplastic material using rotating disks to hold the sheet edges, wherein the sheet is heated to stretching temperature in known manner and, when the sheet edges come into contact with the circumferential surfaces of the disks they are pressed onto said surfaces so as to exclude air from between the sheet edges and the circumferential surfaces, the sheet edges being heated to a temperature such that they become adapted and conform to the circumferential surface of the disks whereby they are held by the disks in a force-locking manner during the stretching process.

To carry out the aforesaid process a device is used which comprises at least one pair of heated feed rollers, at least one heating device to maintain or regulate the sheet temperature in the stretching zone, at least one pair of rotating disks capable of being heated to hold the sheet edges and at least one pair of draw-off rollers, and means of pressing said sheet edges onto the circumferential surfaces of the disks with the exclusion of air from between the sheet edges and the circumferential surfaces.

It is an object of the present invention to provide an improvement in the process for stretching a sheet of thermoplastic material produced by blow molding which comprises laying flat a tubular sheeting issuing from the extruder with rotating or oscillating movement shortly after it has left the extrusion die and is still in the hot state, welding it to a flat sheet and regulating it to stretching temperature, bringing into contact the sheet edges with the circumferential surfaces of two rotating disks, pressing the sheet edges onto said circumferential surfaces with the exclusion of air from between the sheet edges and the said surfaces, stretching and drawing off the sheet.

For stretching the sheet in transverse direction the rotating disks of the stretching device are arranged at a diverging angle to the direction of movement of the sheet.

Transverse stretching may also be effected in stages when the stretching device comprises several pairs of disks arranged at diverging angles one behind the other. The angles of the following pairs of disks may increase, decrease or may be equal. If desired transverse stretching can be compined with longitudinal strectching. Longitudinal stretching can be performed after transverse stretching by measures known in the art. Alternatively, biaxial stretching can be effected by operating the pair of draw-off rollers of the device for transverse stretching at a higher speed than the pair of feed rollers.

By combining the stretching device with an extruder for blow molding the feeding width of the sheet to be stretched can be regulated in known manner by expanding the tube to a greater or smaller extent before laying flat.

The tubular sheeting is extruded from a blow head oscillating or rotating round its axis and squeezed by a pair of heated squeeze rollers positioned directly before the stretching device. In general, not only the blow head but also the extruder cylinder rotate.

In the known processes for the manufacture of stretched thermoplastic sheets by means of an extruder with annular die transverse stretching is effected by expanding the tube to a larger diameter. A simultaneous longitudinal stretching can be obtained by drawing off the blown up tubular sheeting with a speed that is higher than the issuing rate of the melt. Stretching of this type to obtain a shrinking or non shrinking sheet, i.e., in the elastic or plastic range, has to be carried out in a definite, mostly very narrow temperature ranges. the requirements of a controlled heat exchange involve, however, considerable technical problems. In the process of the present invention stretching is effected after the blown tube has been laid flat and, therefore, the istance between the extuder and the pair of squeeze rollers can be extremely short so that the temperature control does not raise any problem. Depending on the thickness of the sheet and the type of thermoplastic material the distance between the extruder die and the pair of heated squeeze rollers shall be so long that the blown tube reaches the squeeze rollers at a temperature at which it can still be welded, i.e., is still plastic. Depending on the type of sheet material the distance corresponds to 0.5 to 10 times, preferably 1 to 3 times, the diameter of the die outlet. As compared with known transverse stretching frames with circulating clip chains, the stretching device following the squeeze rollers also has a much shorter over-all length and, therefore, the whole unit requires a much smaller space. To produce thin polyvinyl chloride films this length, inclusive of the extruder the dimension of which remain constant, is only about 5 meters, while a conventional unit requires about 20 meters.

The short distance between the extruder and the squeeze rollers offers the further advantage that the unit can be installed horizontally without any supporting means for the blown tube being necessary. In the known devices for stretching blown sheets this difficulty is mostly overcome by a vertical arrangement of the unit which requires a considerable height of building.

When the blown tube is seized by the squeeze rollers it is still not so that the formation of creases and unevenesses in flattening are excluded and the welding of the sheet layers is considerably facilitated. In the known blow molding processes the flattened tube is generally cut open so as to form two continuous flat sheetings which necessitate two separate means for winding them up. Moreover, a tubular film biaxially stretched in the elastic state can be welded with great difficulty only, if at all. The process of the present invention permits to take advantage of the blow molding of tubular films without taking into the bargain the aforsaid disadvantages. The advantages reside in the fact that by the rotating movement of the blow head the variations in thickness of the sheet, which cannot be avoided in the extrusion process, are distributed over the width of the sheet so that so-called "piston rings" or beads impairing the plane surface of the sheet and rendering difficult the winding up process are avoided. On the other hand, by welding together two layers of sheeting a stretched non-porous plastics sheet is obtained. Usual stretched flat sheets are not free of pores and can be rendered non-porous only by doubling. This can be effected only by a complicated process, i.e., a layer must be applied to render the surface of the biaxially stretched film weldable.

The process and device in accordance with the present invention can be used for all types of thermoplastic sheets, preferably sheets of polyvinyl chloride, polyolefins or polyesters.

Figure 2:
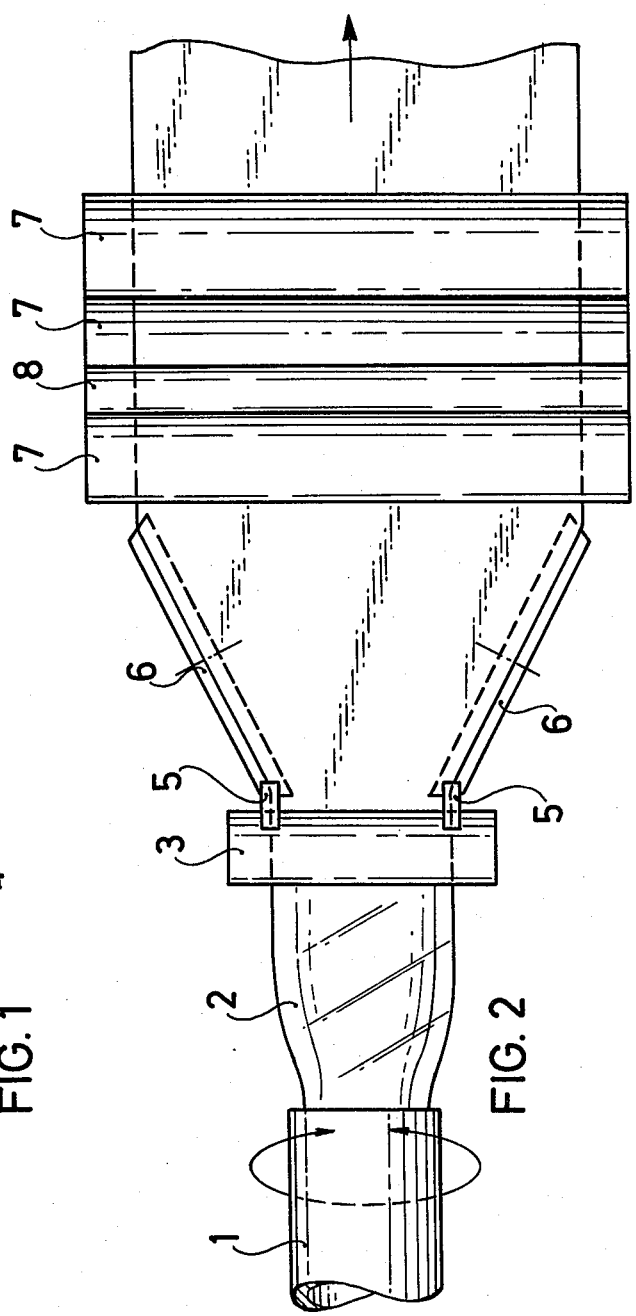

The device according to the invention is illustrated diagrammatically by way of example in the accompanying drawing in which FIG. 1 is a plan view of the device and FIG. 2 a cross-sectional view. In the drawing the individual elements of the device are arranged horizontally. It is also possible, of course, to choose a vertical arrangement with downward or upward direction of extrusion.

A tubular sheet of plastics material 2 issues from the rotating or oscillating blow head 1 of an extruder not shown and the tube is blown up by internal pressure. At a short distance from the blow head the tube is flattened by a pair of squeeze rollers consisting of a heated smooth steel roller 3 and an elastic roller 4 so that the two halves of the tube are welded together. The edges of the flat sheet obtained are taken up by the circumferential surfaces of the two heated rotating disks 6 arranged at an angle to the direction of movement of the sheet and are firmly pressed onto the said surfaces by elastic rollers 5. After having passed the transverse stretching zone with the two heated disks 6, the stretched sheet is drawn off by rollers. In the present case a system of draw-off rollers 7 and 8 is used which permit an additional longitudinal stretching, if desired. The roller system of the drawing is composed of three heated or cooled smooth steel rollers 7, with allotted elastic contact rollers 8. In the roller gaps between rollers 7 the sheet may additionally be stretched in longitudinal direction. Means for further cooling the sheet, cutting the edges and winding up are not shown.

by selection of the internal pressure the diameter of the tubular sheet can be maintained constant or enlarged. For the supsequent stretching in the elastic range this offers the additional advantage that by varying the internal pressure the width of the sheet can be adjusted and together with the variation of the distance between the disks and the disk angle in the stretching device the stretching ratio and the final width of the sheet can be varied independently one of the other. The same applies to the thickness of the sheet which can be regulated by the number of revolutions of rollers 3 and 4 and disks 6 or of roller system 7 and 8.

As already stated above, the device according to the invention is not limited to the horizontal arrangement represented in the drawing. With an extruder with vertical upward or downward direction of extrusion roller pair ¾, optionally combined with a further roller, can be arranged in horizontal direction and followed by a horizontal stretching device.

what is claimed is:

1. An apparatus for producing stretched solid thermoplastic sheet material comprising an axially rotating blow head for blowing a tubular sheet of solid thermoplastic sheet material, a pair of heated squeeze rollers disposed adjacent the blow head for flattening and welding together the blown tubular sheet of solid thermoplastic material, a pair of rotatably mounted disks disposed adjacent and after the heated squeeze rollers in contact with the edges of the flattened and welded together sheet material, heating means arranged to apply heat to the edges of the sheet material contacting the disks, the disks being disposed at a divergent angle with respect to the edges of the sheet material, pressure applying means disposed on the opposite sides of said sheet material from the disks and adjacent the disks for applying pressure to the edges of the sheet material to urge them in forceful contact with the circumferential surfaces of the disks whereby the formation of air pockets between the edges and the disks is prevented and the edges are maintained in firm engagement with the circumferential surface of the disks by atmospheric pressure to laterally stretch the sheet of thermoplastic material in accordance with the divergent angle of the disks without using any mechanical means gripping over the edges of the sheet, and the distance between the axially rotating blow head and the pair of heated squeeze rollers is approximately from one-half to ten times the diameter of the outlet from the axially rotating blow head.

2. An apparatus as set forth in claim 1 wherein the apparatus is substantially horizontally disposed without any supporting means for the blown tubular sheet of solid thermoplastic sheet material.

3. An apparatus for producing stretched solid thermoplastic sheet material comprising an axially rotating blow head for blowing a tubular sheet of solid thermoplastic sheet material, a pair of heated squeeze rollers disposed adjacent the blow head for flattening and welding together the blown tubular sheet of solid thermoplastic material, a pair of rotatably mounted disks disposed adjacent and after the heated squeeze rollers in contact with the edges of the flattened and welded together sheet material, heating means arranged to apply heat to the edges of the sheet material contacting the disks, the disks being disposed at a divergent angle with respect to the edges of the sheet material, pressure applying means disposed on the opposite sides of said sheet material from the disks and adjacent the disks for applying pressure to the edges of the sheet material to urge them in forceful contact with the circumferential surfaces of the disks whereby the formation of air pockets between the edges and the disks is prevented and the edges are maintained in firm engagement with the circumferential surface of the disks by atmospheric pressure to laterally stretch the sheet of thermoplastic material in accordance with the divergent angle of the disks without using any mechanical means gripping over the edges of the sheet, and the distance between the axially rotating blow head and the pair of heated squeeze rollers is approximately from one to three times the diameter of the outlet from the axially rotating blow head.

4. An apparatus for producing stretched solid thermoplastic sheet material comprising an axially rotating blow head for blowing a tubular sheet of solid thermoplastic sheet material, a pair of heated squeeze rollers disposed adjacent the blow head for flattening and welding together the blown tubular sheet of solid thermoplastic material, a pair of rotatably mounted disks disposed adjacent and after the heated squeeze rollers in contact with the edges of the flattened and welded together sheet material, heating means arranged to apply heat to the edges of the sheet material contacting the disks, the disks being disposed at a divergent angle with respect to the edges of the sheet material, pressure applying means disposed on the opposite sides of said sheet material from the disks and adjacent the disk for applying pressure to the edges of the sheet material to urge them in forceful contact with the circumferential surfaces of the disks whereby the formation of air pockets between the edges and the disks is prevented and the edges are maintained in firm engagement with the circumferential surface of the disks by atmospheric pressure to laterially stretch the sheet of thermoplastic material in accordance with the divergent angle of the disks without using any mechanical means gripping over the edges of the sheet, and the overall length is approximately five meters.

* * * * *